Patented May 29, 1945

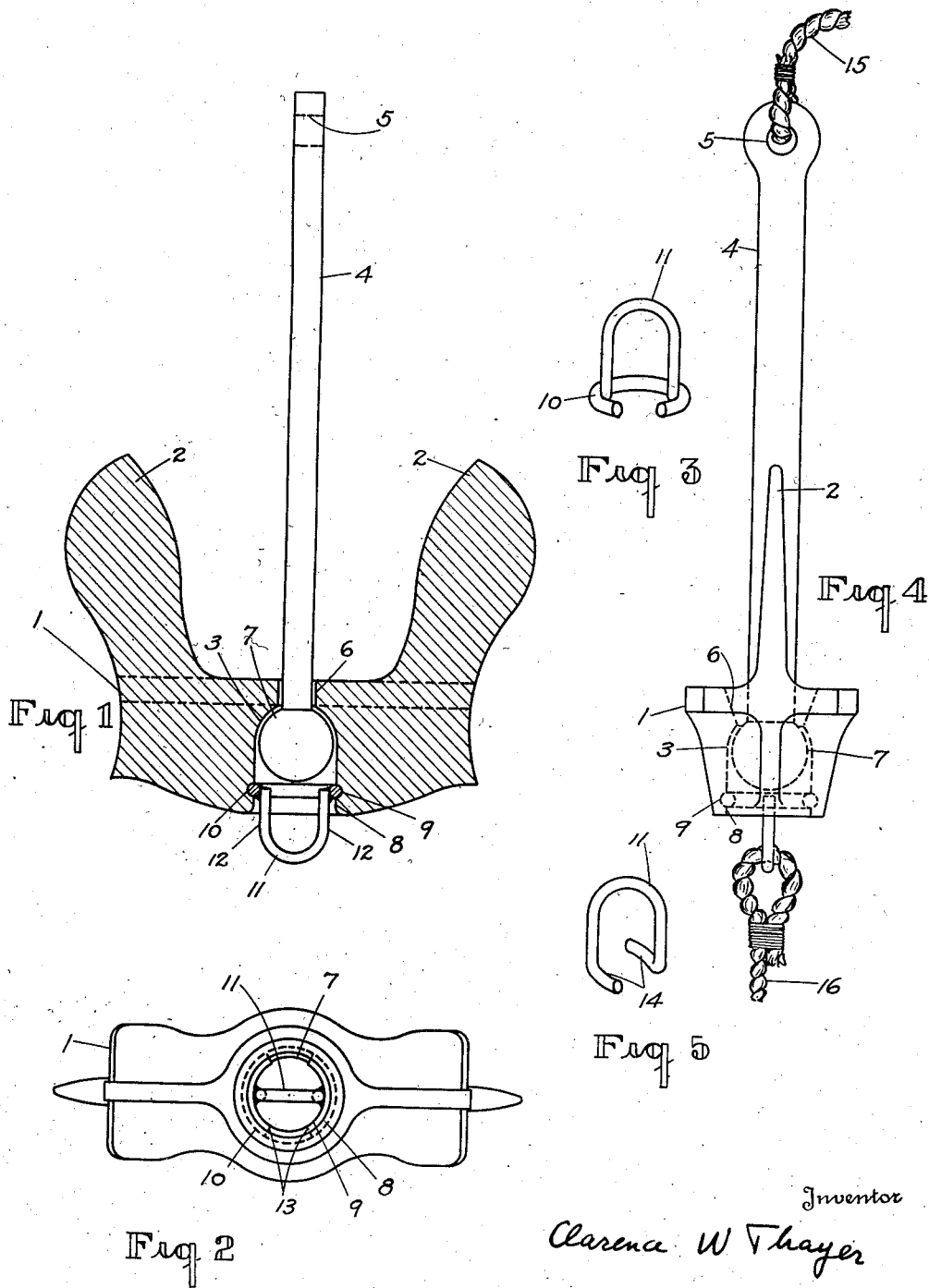

2,377,054

UNITED STATES PATENT OFFICE 2,377,054

ANCHOR

Clarence W. Thayer, Erie, Pa.

Application September 15, 1944, Serial No. 554,182

1 Claim. (Cl. 114—208)

In anchors having a stem for attachment to a hauling rope and flukes extending from the front of the anchor in the general direction of the stem, occasionally the flukes become imbedded so as to be difficult to dislodge by a direct pull on the stem. The present invention relates to an anchor construction having provisions for attaching another hauling rope to the back of the anchor so that a pull may be exerted having a rearward component which will more easily dislodge the flukes.

In the accompanying drawing, Fig. 1 is a sectional view of an anchor embodying my invention; Fig. 2 is a bottom view; Fig. 3 is a perspective of the eye or back ring; Fig. 4 is a side view of the anchor; and Fig. 5 is a modification of the back ring.

Referring to the drawing, there is shown an anchor having a body 1 provided with flukes 2 and a socket 3 for receiving the stem 4 having an eye 5 at its upper end for attachment with a hauling rope. The socket 3 is open at both ends, the opening at the upper end being a rectangular slot 6 through which the stem loosely projects and narrower than a spherical enlargement 7 in the lower end of the stem. With this construction the stem is free to swivel in the body of the anchor and to pivot through an angle determined by the length of the slot. At the lower end of the socket is an opening 8 of slightly greater diameter than the spherical enlargement 7 and having adjacent its mouth an annular groove 9. Seated in the groove is a ring 10 having portions projecting inwardly into the socket sufficient to retain the anchor stem within the socket. Extending rearwardly from the socket is an eye 11 having shanks 12 fixed to opposite sides of the ring 10. If desired, the ring 10 may be cut away as indicated by dotted lines 13 to decrease the rigidity of the eye and ring to facilitate assembly.

As indicated in Fig. 5, the eye 11 may be made with integral extensions 14 which fit in the groove 9 and serve the same function as the ring. After assembly the anchor is galvanized and the zinc fills the spaces between the ring 10 and groove 9 making a secure joint.

In the use of the anchor a hauling rope 15 is attached to the eye 5 on the stem and another hauling rope 16 is attached to the eye or back ring 11. If the flukes become imbedded so that an excessive pull on the hauling rope 15 is required, the anchor may be dislodged by a pull on the hauling rope 16 which will pivot the body of the anchor about the lower end of the stem and be more effective in dislodging the flukes.

What I claim as new is:

In an anchor having a body with a socket open at both ends, a stem projecting loosely through one opening and retained in the socket by an enlargement on the stem, the other opening being of greater diameter than the enlargement, a groove in the socket adjacent the other opening, an eye extending beyond the socket and having spaced shanks with the ends having portions seated in the groove and projecting inwardly therefrom sufficient to retain the enlargement of the stem within the socket.

CLARENCE W. THAYER.